United States Patent
Kramer et al.

(10) Patent No.: US 7,278,091 B2
(45) Date of Patent: Oct. 2, 2007

(54) METHOD AND SYSTEM FOR SELECTIVELY ENFORCING PRESENTATION THEMES

(75) Inventors: Nicholas M. Kramer, Seattle, WA (US); Mark J. Finocchio, Redmond, WA (US); Robert E. Sinclair, II, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 10/437,369

(22) Filed: May 13, 2003

(65) Prior Publication Data
US 2004/0230888 A1    Nov. 18, 2004

(51) Int. Cl.
*G06F 15/00* (2006.01)
(52) U.S. Cl. .................. 715/501.1; 715/513; 715/517; 715/530
(58) Field of Classification Search ................ 715/513, 715/747, 712, 517, 530
See application file for complete search history.

(56) References Cited

U.S. PATENT DOCUMENTS

| | | | |
|---|---|---|---|
| 5,732,271 A | 3/1998 | Berry et al. | |
| 5,860,073 A | 1/1999 | Ferrel et al. | |
| 5,949,417 A * | 9/1999 | Calder ........................ | 715/788 |
| 6,067,578 A | 5/2000 | Zimmerman et al. | |
| 6,199,082 B1 | 3/2001 | Ferrel et al. | |
| 6,256,031 B1 | 7/2001 | Meijer et al. | |
| 6,342,907 B1 | 1/2002 | Petty et al. | |
| 2004/0222992 A1* | 11/2004 | Calkins et al. .............. | 345/473 |
| 2004/0230575 A1* | 11/2004 | Kramer et al. ................ | 707/6 |

OTHER PUBLICATIONS

Badros, Greg, et al., "Constraint Cascading Style Sheets for the Web", 1999 ACM. CHI Letters vol. 1, 1, pp. 73-82.*
W3C Cascading Style Sheets, Apr. 19, 2002.
W3C Cascading Style Sheets, level 2, CSS2 Specification, May 12, 1998.

* cited by examiner

*Primary Examiner*—Heather R. Herndon
*Assistant Examiner*—R. Singh
(74) *Attorney, Agent, or Firm*—Merchant & Gould

(57) ABSTRACT

Disclosed is a theme property sheet system that supports presentation themes by coordinating values provided to elements used in a user interface. When an interface user expresses a preference for a particular presentation theme, that theme's property sheet is given precedence over other mechanisms for setting property values. By appropriately setting these values in the interface, the theme property sheet enhances the coherence of the interface. The theme property sheet allows an interface designer to add new presentation elements to a user interface without being concerned about presentation themes. The default for each property as set by the designer is overridden, when necessary, by the theme sheet. In a few particular cases, an application designer needs to override even the user's theme preferences. A mechanism is provided to support these exceptional cases.

32 Claims, 8 Drawing Sheets

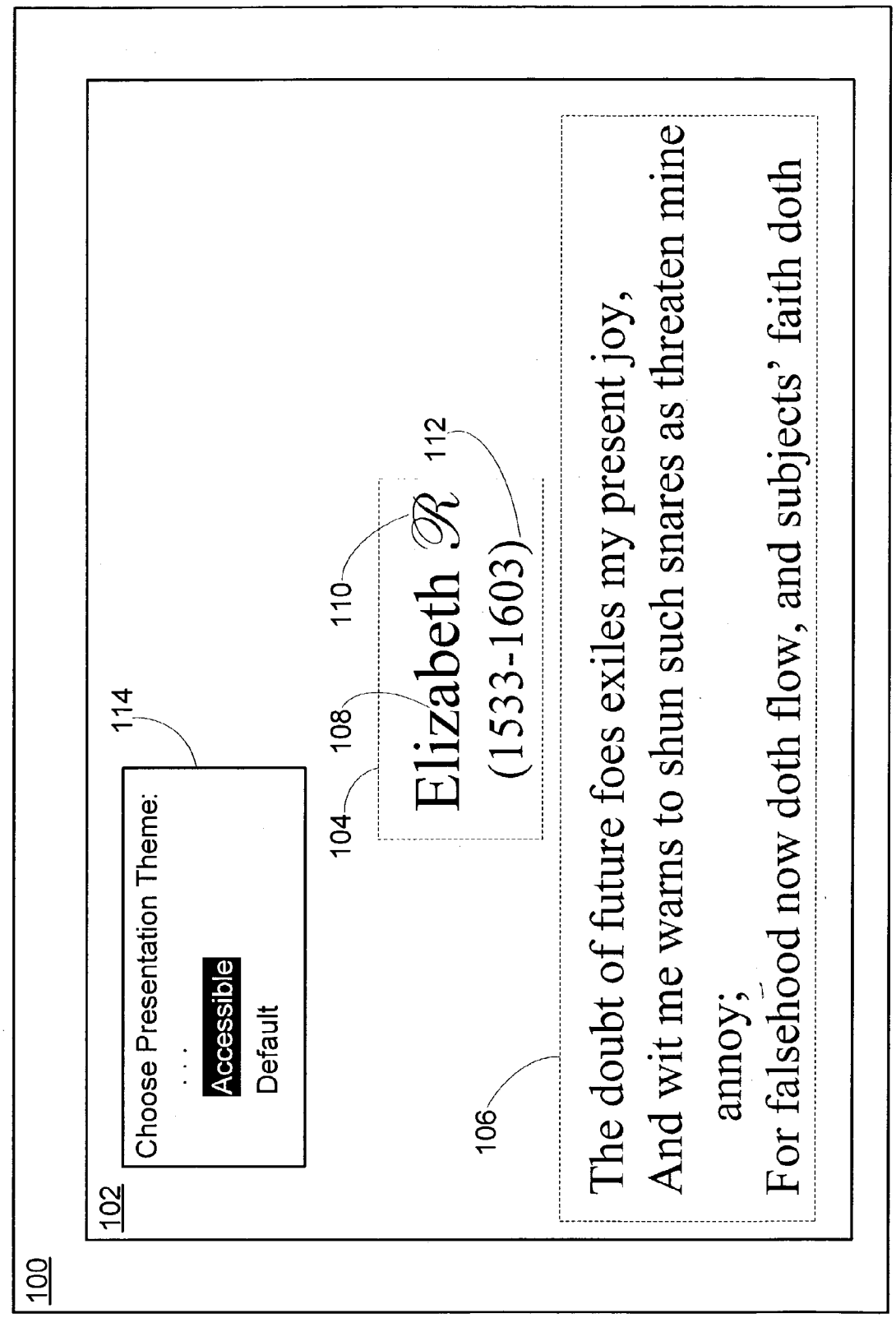

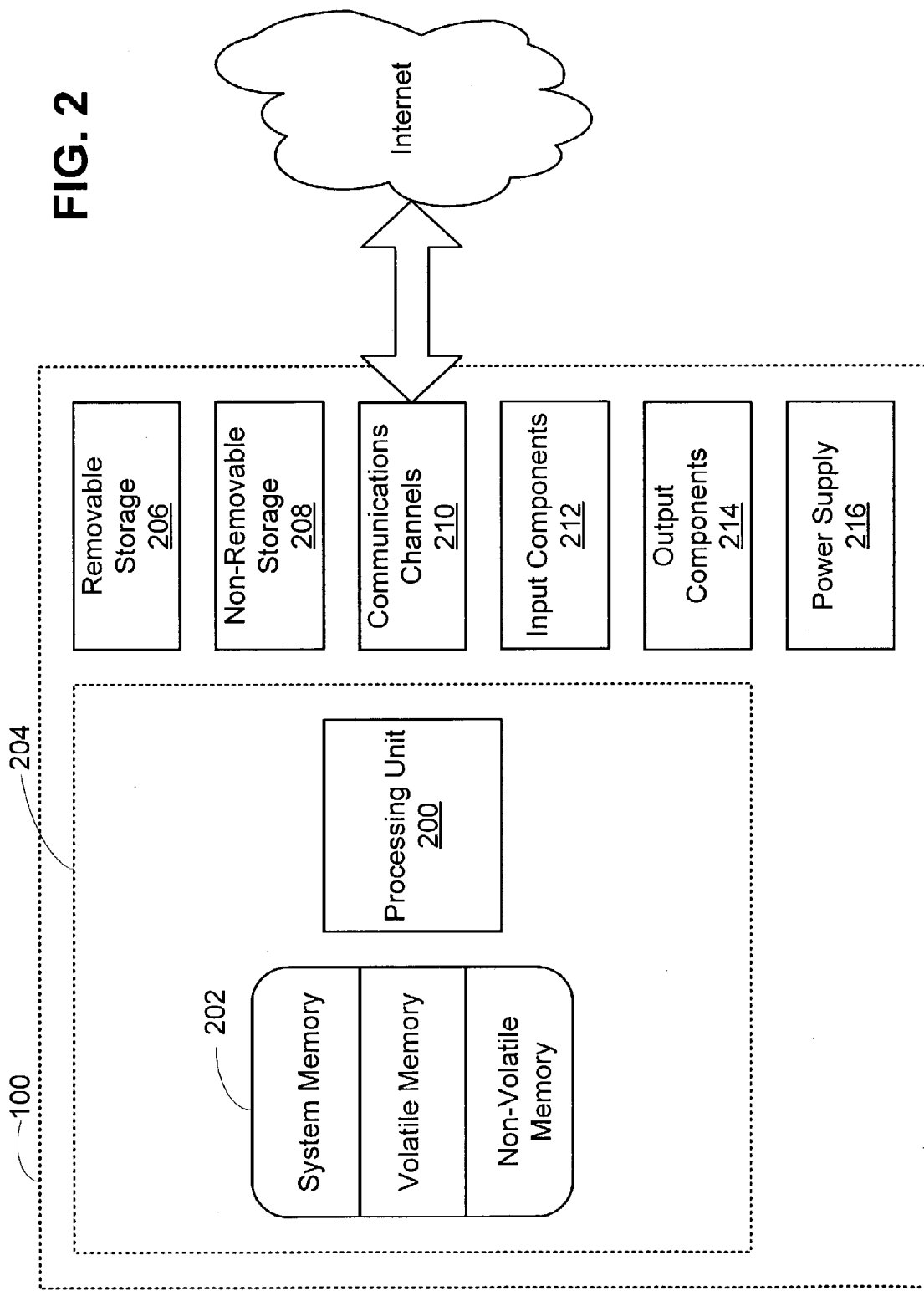

Lookup Order, from Most to Least Important:

- Important Theme in Default Property Sheet
- In-Line Value and Scoped Property Sheet
- Ancestor's Scoped Property Sheet
- Unimportant Theme in Default Property Sheet
- Value Inheritance
- Default Value

502
//Accessibility Theme Sheet
TextBlock {Font = "Roman"}
TextBlock {FontSize = "18pt."}

← Designated as Important

504
//TextBlock Element Default Property Sheet
TextBlock {Font = "Script"}
TextBlock {FontSize = "12pt."}
...
Suffix {Font = "Script"}

METHOD AND SYSTEM FOR SELECTIVELY ENFORCING PRESENTATION THEMES

RELATED APPLICATION

The present application contains subject matter related to that of patent application "Method and System for Providing Interface Defaults," Ser. No. 10/437,324.

TECHNICAL FIELD

The present invention is related generally to computer-provided user interfaces, and, more particularly, to extensible user interfaces.

BACKGROUND OF THE INVENTION

A well designed user interface employs both content and presentation (or "style") elements to effectively make a point or to lead a user to relevant information. Designers traditionally draw upon standard toolkits when implementing their presentation choices. For example, in a visual user interface, a designer emphasizes the presentation of some content, e.g., synopses of news articles, by selecting an element from the toolkit that enlarges the content's font or that presents it in contrasting colors. Toolkits provide similar techniques for audio user interfaces where, for example, article titles are spoken more loudly and slowly than article contents.

Within a standard toolkit, the set of presentation elements is fixed. This fixed set provides many advantages. Interface users are already familiar with such standard presentation elements as a window, a drop-down menu, and a pushbutton. While some of these elements serve mostly to frame other elements, users expect some elements to be "active": to invoke a function when selected. Because the set of elements in the toolkit is fixed for traditional user interfaces, a designer is assured that each element has been carefully developed by the provider of the toolkit. Each element in the toolkit is given a coherent set of properties, the properties are provided with meaningful default values, and the properties interact in a rational manner. For example, a pushbutton element typically has the properties of (among many others) (1) a color and (2) an action invoked when the pushbutton is selected by a user. These properties interact rationally: The pushbutton changes color from its default blue to purple to show that it has been selected. Because of the careful development standing behind a standard toolkit, an interface designer can focus his attention on certain aspects of the interface knowing that other aspects will be cared for in a rational manner by the toolkit.

Valuable as they have proven to be, standard toolkits limit an interface designer. "Extensible" toolkits have been developed to allow designers to go far beyond what is achievable by the fixed set of presentation elements in a standard toolkit. Using an extensible toolkit, a designer creates new presentation elements. The new elements can have new properties and new actions and can interact in new ways with other elements. The designer combines newly created elements with existing elements from a standard toolkit to implement his vision of a user interface.

Extensible toolkits, however, jeopardize several of the advantages of the standard toolkit. An extensible toolkit, by definition, has no one toolkit provider: Every designer can create new presentation elements. A designer might fail to account for all possible situations in which his new element can be used. Properties of the element can have undefined values in some situations, and the values of the properties might make no sense in other situations. Even if one new element is internally consistent in all situations, the potential of having many designers provide elements to a single user interface invites coordination problems. If two elements attempt to define a property of the user interface, their individual settings might conflict in ambiguous ways. In short, new elements might not work as planned, and even if they do, they might interact in unplanned and unfortunate ways with other new elements and with existing elements taken from a standard, non-extensible toolkit.

A related danger of extensible toolkits concerns "themes." In a carefully designed user interface, presentation property values, each possibly unimportant in itself, are chosen to work together to make the interface into a unified and coherent whole. The set of these choices is called a "theme" for the user interface. For example, an operating system provider consistently uses a complementary pallet of colors and fonts so that a user can immediately know that a particular interface is provided by the system. The producer of a large software package presents interfaces with a common theme both to emphasize that the products in the package are meant to work together and to distinguish the software package from a competitor's package and from the operating system. In another example, a user can select an "accessibility" theme in which the visual elements of a user interface are presented in a manner more easily read (e.g., with a larger font or with more strongly contrasting colors). A coherent interface theme greatly helps a user in logically grouping information and greatly reduces the information overload present in many modern computing environments. However, interface coherence is not readily achieved when designers are free to use an extensible interface. The designer might develop presentation elements that clash with an existing theme or that neglect to account for a user's theme selection.

One solution to the problems introduced by the flexibility of extensible interface toolkits is to enforce a rigorous development and test cycle on each new presentation element. Of course, such rigor would negate much of the incentive for using an extensible toolkit: A designer uses an extensible toolkit in order to concentrate on unique aspects of new presentation elements without having to devote the bulk of development time to checking that each new element complies with all the mundane necessities of creating a unified interface.

SUMMARY OF THE INVENTION

In view of the foregoing, the present invention supports presentation themes by coordinating values provided to elements used in a user interface. Theme values are collected into a logical structure called a "theme property sheet." When an interface user expresses a preference for a particular presentation theme, that theme's property sheet is given precedence over other mechanisms for setting property values. By appropriately setting these values in the interface, the theme property sheet enhances the coherence of the interface.

Theme "values" are broadly understood. Not limited to fixed values, the theme property sheet can provide a rule for calculating a theme value. The rule can take into account, for example, aspects of the present environment. When necessary, the rule is invoked to calculate a theme value for a property.

The theme property sheet allows an interface designer to add new presentation elements to a user interface without being concerned about presentation themes. The default for each property as set by the designer is overridden, when necessary, by the theme sheet.

In a few particular cases, an application designer needs to override even the user's theme preferences. A mechanism is provided to support these exceptional cases.

While the examples in the specification are primarily visual, that is due solely to the written nature of a patent specification. The present invention applies as well to other types of interface elements, such as audio elements.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 1b is a block diagram showing the text-based user interface of FIG. 1a after a user has selected a more accessible (i.e., a more easily readable) presentation theme;

FIG. 2 is a schematic diagram generally illustrating an exemplary computer system that supports the present invention;

FIG. 3 is a list, ordered by priority, of locations of rules that can provide a value to a property of a user interface element;

FIG. 5 is a block diagram showing how rule priorities can be set to override even a user's choice of presentation theme.

DETAILED DESCRIPTION OF THE INVENTION

Figure 1A:
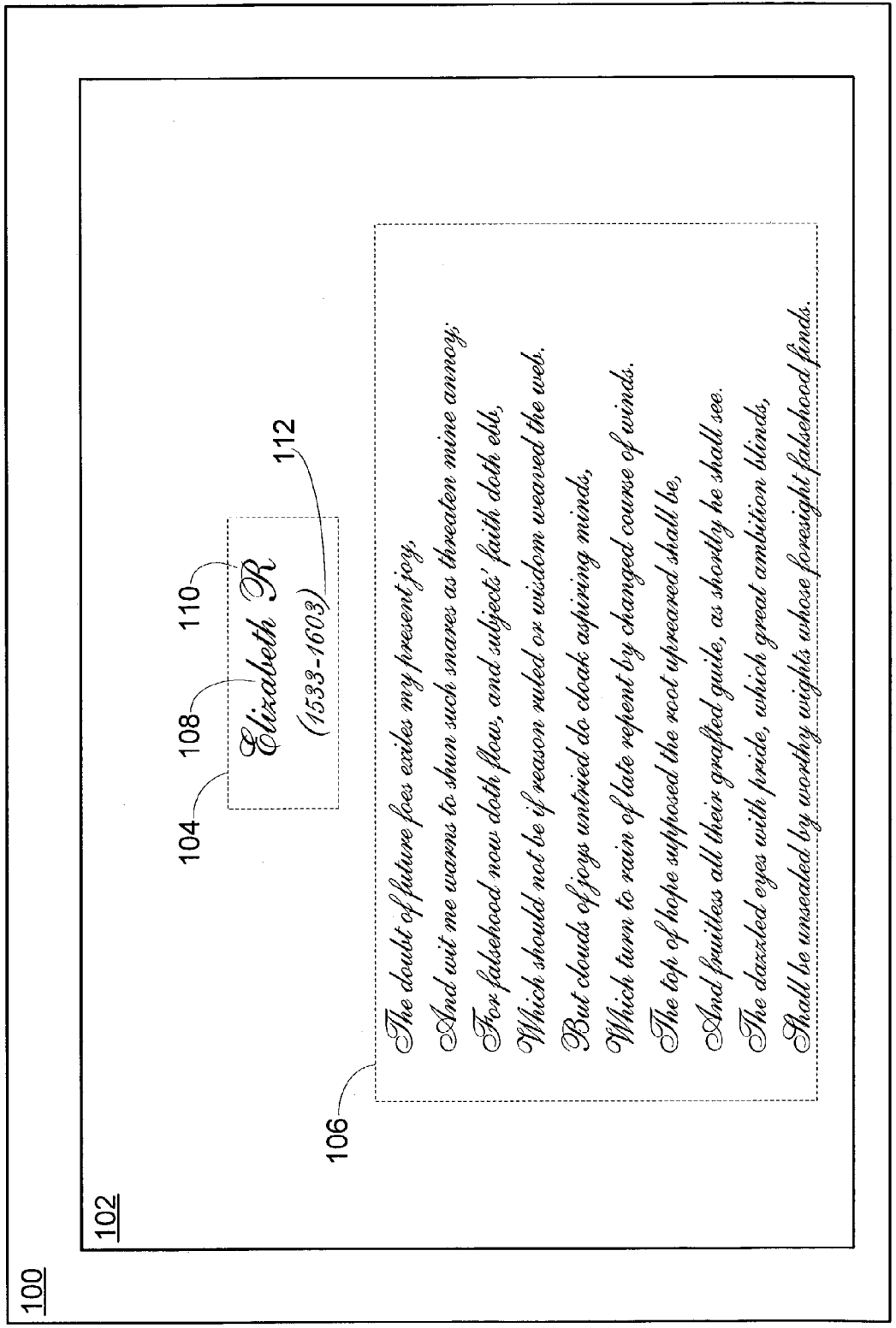
FIG. 1a is a block diagram showing an exemplary text-based user interface that employs both content and presentation elements.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention coordinates among rules that provide values to presentation elements in a user interface. In some embodiments, default values are collected into a logical structure called a "default property sheet." Designers of interface elements add default values for the properties of the elements that they define. (An interface designer may be the same person who designed some of the elements used in the interface, but need not be. The interface designer can take the elements created by element designers and customize them to create an interface.) In some embodiments, values are collected into "theme property sheets." When an interface user expresses a preference for a particular presentation theme, that theme's property sheet is given precedence over other mechanisms for setting property values. By appropriately setting values in the interface, the theme property sheet enhances the coherence of the interface. The default property sheet can be a "theme of last resort." If a property of a presentation element is not given a value elsewhere, then the property is given the value specified in the default property sheet.

These concepts are illustrated by means of embodiments of the present invention, the illustrations beginning with FIG. 1a. A user interface is presented on a display screen 102 of a computing device 100. The user interface consists of two text blocks 104 and 106. The first text block 104 presents information about the author of a poem. It is divided into three subsidiary text blocks: the author's name 108, a suffix 110 to that name, and the author's lifespan 112. The second text block 106 contains as much of the text of the poem as fits on the display screen 102.

This user interface contains both content and presentation properties. The content is the text in the two text blocks 104 and 106 while the presentation properties include, for example, the size and type of the font and the arrangement of the text on the display screen 102. To make sure that these presentation properties are given appropriate values, the designer of this interface chose default values for them. These default values are collected into the exemplary default property sheet 504 of FIG. 5 (discussed below). In the present example, the designer of the user interface of FIG. 1a has chosen a script-like font for the two text blocks 104 and 106 and has chosen a larger font for the author text block 104 than for the poem text block 106.

Note that while the present invention is very general, the nature of a written patent specification imposes limits on what examples can be depicted. The examples used here are all static, text-based, and black-and-white. Those familiar with modern user interfaces will recognize the utility of adding, for example, color, full motion images, sound, and interactivity. The present invention is meant to cover all such interface elements, even though they cannot be depicted in this specification.

An interface user might understandably find the default presentation style of FIG. 1a difficult to read. To address that problem, the user in FIG. 1b invokes a pull-down menu 114 and selects an "Accessible" theme for the presentation. An accessibility theme sheet (see, for example, 502 in FIG. 5, discussed below) contains values for selected presentation properties in order to provide a consistent and more easily read interface. In general, this presentation theme overrides the default values set by the interface designer. For example, both text boxes 104 and 106 are presented in a font larger than the default shown in FIG. 1a. Also, the majority of the content is presented in a Roman font, generally easier to read than the script font of FIG. 1a. There is one exception to this, however: The suffix field 110 remains in the script font chosen by the interface designer. According to some embodiments of the present invention, the designer can specify that his value choice is so important that it should override even the choices of the interface user. In the example of FIGS. 1a and 1b, the suffix 110 is not the author's last initial, it is her title: R for regina, or queen. The interface author thought that it was so important to emphasize that this poem was written by Queen Elizabeth I of England that he made his choice of the script font for the suffix 110 override the user's presentation theme choice. How an author can do this is described below in relation to FIG. 5.

The computing device 100 of FIGS. 1a and 1b may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the computing device 100 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, tablet devices, multiprocessor systems, microprocessor-based systems, set-top boxes, programmable consumer electronics, network PCs, minicomputers, mainframe computers, and distributed computing environments that include any of the above systems or devices. In its most basic configuration, the computing device 100 typically includes at least one processing unit 200 and memory 202. The memory 202 may be volatile (such as RAM), non-volatile (such as ROM or flash memory), or some combination of the two. This most basic configuration is illustrated in FIG. 2 by the dashed line 204. The computing device 100 may have additional features and functionality. For example, the computing device 100 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by device 100. Any such computer-storage media may be part of device 100. Device 100 may also contain communications channels 210 that allow the device to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. The computing device 100 may also have input devices 212 such as a keyboard, mouse, pen, voice-input device, tablet, touch-input device, etc. Output devices 214 such as a display 102 (which may be integrated with a touch-input device), speakers, and printer may also be included. All these devices are well known in the art and need not be discussed at length here.

FIG. 3 shows some of the possible sources of rules that provide values to properties of a user interface. The lookup order 300 of FIG. 3 shows which rule sources have priority over which other rule sources. With some few exceptions discussed below, when two or more rule sources each contains a rule that provides a value to a given property, the rule source with the higher priority "wins," that is, its rule is applied, and the rules from the other rule sources are ignored.

Figure 4A:
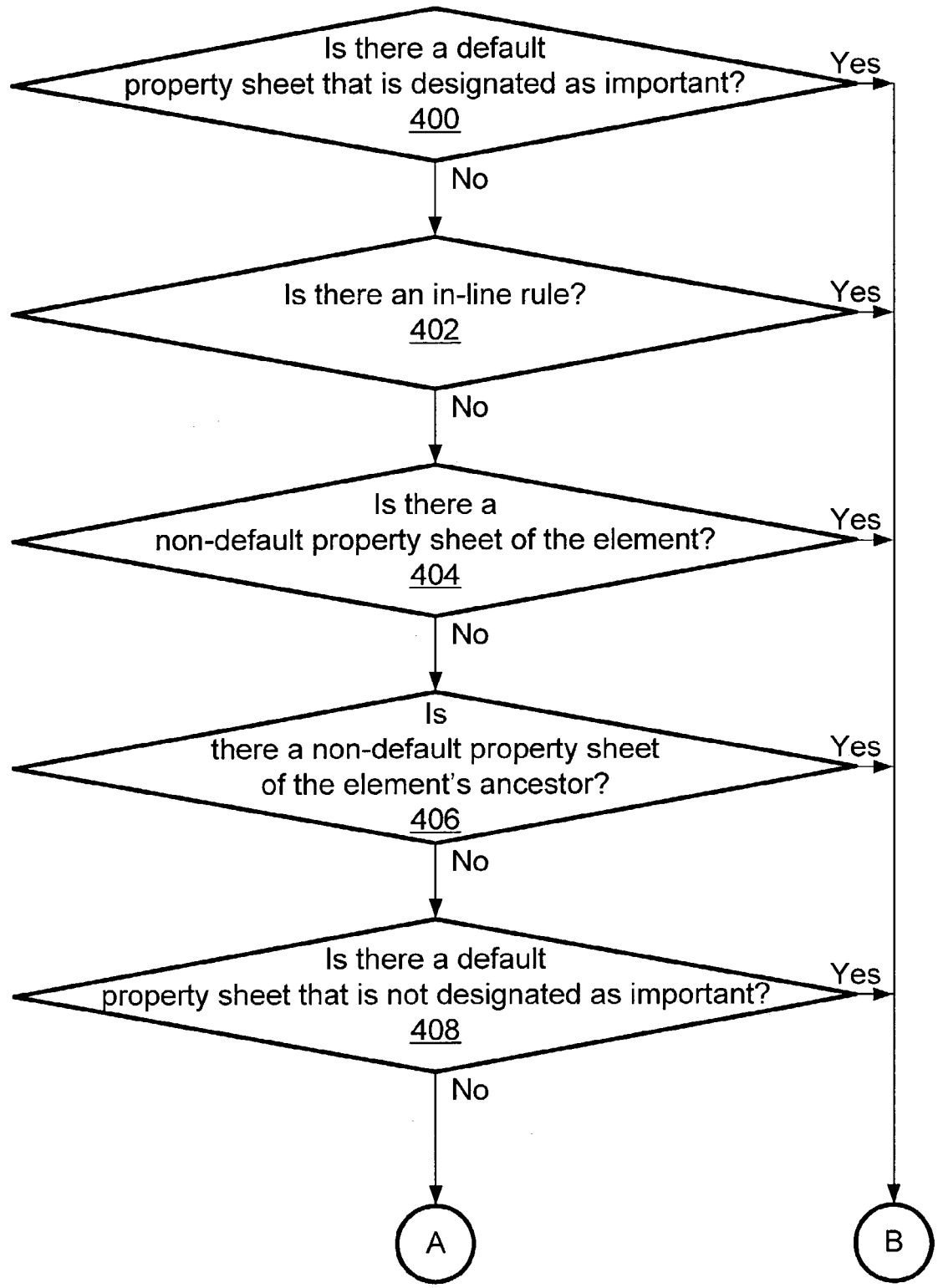
FIGS. 4a and 4b together form a flow chart illustrating an exemplary method for choosing a value to provide to a property of a user interface element.
Figure 4B:
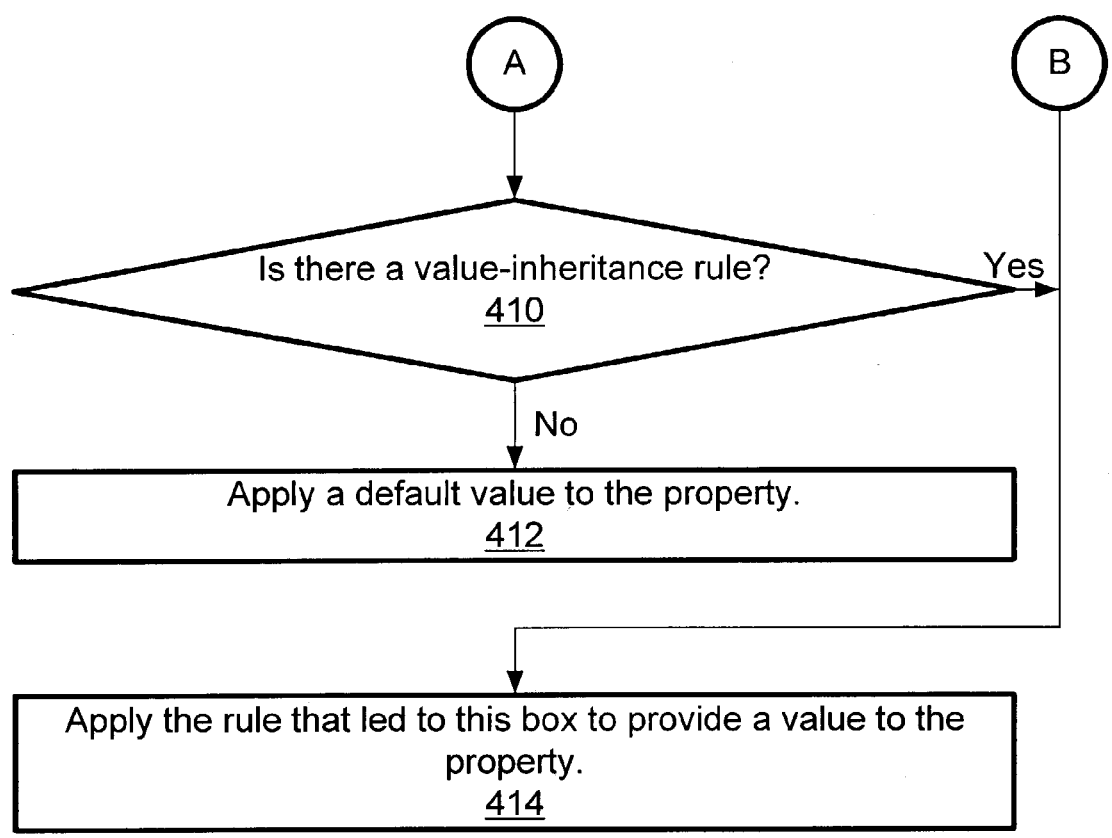

When more than one rule is applicable to provide a value to a given property, the exemplary method of the flow chart of FIGS. 4a and 4b can be used to choose which of the rules to use. For a given property, the search for a rule begins with the topmost element of the lookup order 300 (equivalently, with step 400 of FIG. 4a). (Note that the test in each of steps 400 through 410 of FIGS. 4a and 4b is implied to include testing if the rule source includes a rule that provides a value to the given property.) If a theme or default property sheet is designated as important and if that sheet contains a rule that provides a value to the property, then that rule is applied. In the flow chart, that means that in step 414 of FIG. 4b, the rule from the sheet designated as important is applied. This is what happens in FIG. 1b when the user designates the accessibility theme sheet as important.

If no important property sheet provides a value to the property, then the procedure continues with the next further down element in the rule order 300 (equivalently, with step 402 of FIG. 4a). If an in-line rule provides a value to the property, then that rule is applied in step 414 of FIG. 4b.

If not, then the procedure continues in step 404 to check for a rule in a property sheet that has not been designated as important. This search is for a property sheet that specifically applies to the element of the user interface that contains the given property. In some embodiments, the in-line rules of step 402 and the property sheets of step 404 are of equal priority. In that case, these two steps may be considered as executing concurrently.

The procedure continues to search through rule sources using the lookup order 300. If step 404 does not find an applicable rule, then the search continues through a property sheet of an ancestor of the element that contains the given property (step 406), through a not-designated-as-important default property sheet (step 408), through value inheritance rules (step 410), and finally to applying a default value (step 412). In FIG. 1a, it is the default property sheet (step 408) that sets the values of the properties of the user interface. In any case, the highest priority applicable rule is applied to provide a value to the given property.

Note that the lookup order 300 and the flow chart of FIGS. 4a and 4b are merely illustrative. More efficient methods are known in the art to produce identical results. Note also that some of these rule sources, and how they are to be applied, are described in the prior art. For greater details and for examples from the prior art, see "Cascading Style Sheets, Level 2," May 12, 1998, incorporated herein in its entirety (available at http://www.w3.org/TR/REC-CSS2).

In the discussion of FIG. 1*b* above, it was noted that the interface designer's choice of font style for the suffix 110 (script) overrode the font of the accessibility theme (Roman) chosen by the user. This is an exception to the general lookup order 300 of FIG. 3. Using the scenario of FIG. 1*b* as an example, FIG. 5 illustrates one way in which embodiments of the present invention give this override ability to the interface designer. The set of rule sources 500 includes both an accessibility theme sheet 502 and a default property sheet 504. By choosing the accessibility theme from the pull-down menu 114 in FIG. 1*b*, the user causes the accessibility theme sheet 502 to become designated as important and thus to gain priority over the default property sheet 504. Thus, in general the values for the size and type of font provided by the important theme sheet 502 override the values provided by the default property sheet 504. The font type for the suffix field 110 is an exception to this general rule because the default property sheet 504 is more specific in its assignment of a value than is the accessibility theme sheet 502. As noted above, the suffix field 110 is a kind of text block so that the accessibility theme rule TextBlock {Font="Roman"} applies to it as well. However, when searching for which applicable rule to apply to a property, embodiments of the present invention can consider the default property sheet to be part of the theme sheet. The result is that a very specific rule in a default property sheet takes priority over a more general rule in a theme sheet. In the present example, the specific rule Suffix {Font="Script"} takes priority over the more general rule given just above. The suffix field 110 remains in the script font.

It is expected that only rarely will interface designers use this ability to override the presentation theme choices of the interface user. Otherwise, users will lose faith in their control of the presentation of the interface, and it will become too easy to develop interfaces whose parts are not consistent with each other. However, this ability remains for the special circumstances in which it is required.

Figure 6:
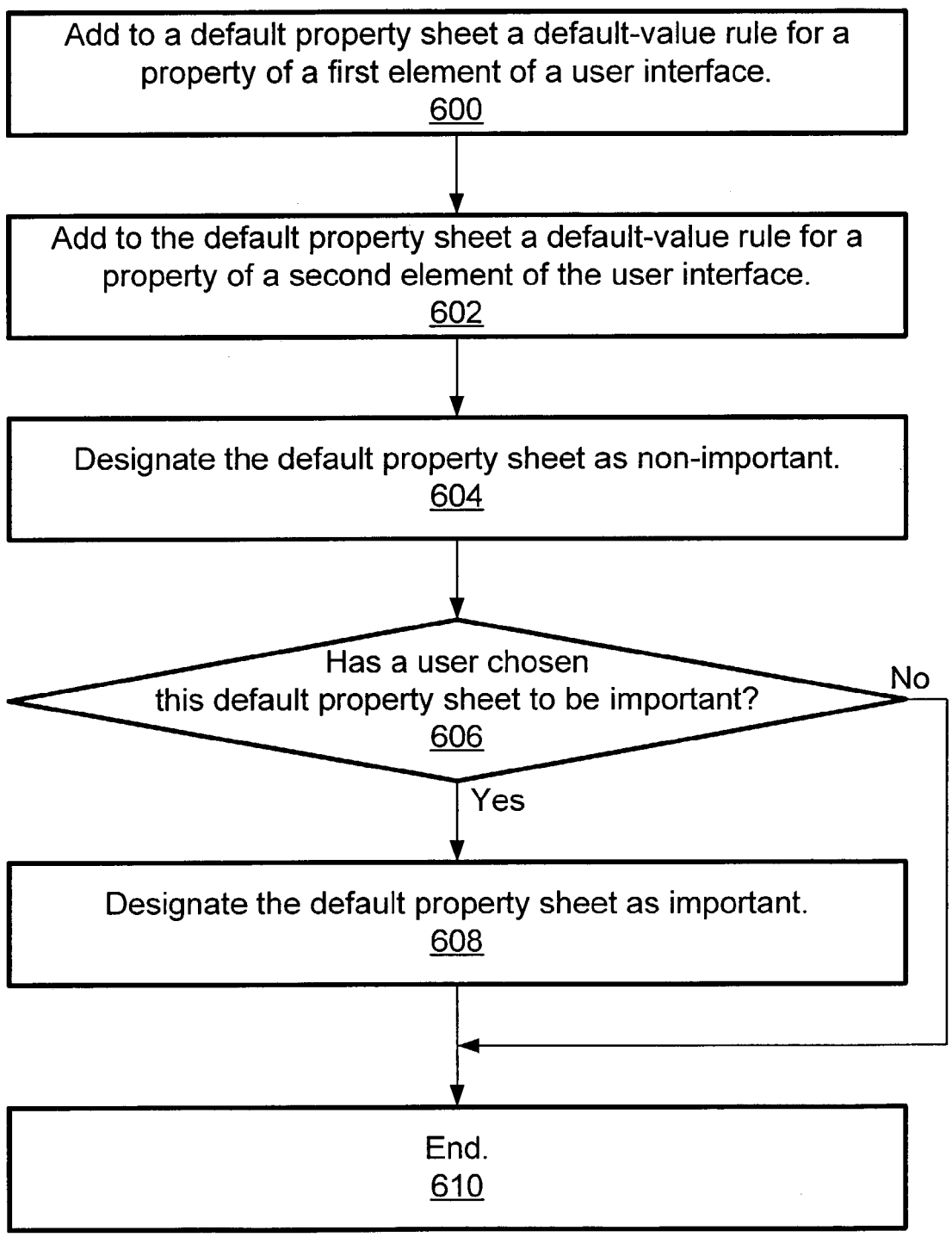
FIG. 6 is a flow chart illustrating an exemplary method for creating a property sheet.

FIG. 6 provides an exemplary method for creating a default property sheet. In steps 600 and 602, default value rules are added to the sheet for different properties. The rules can pertain to the same or to different elements. As noted above, the rules can be simple values or can require some calculation based, for example, on the current environment of the user interface. In step 604, the default property sheet takes its normal value as non-important, but a user can "promote" this sheet to importance in step 608. The same techniques are used to create theme property sheets.

In some embodiments, the order of the addition of the rules to the default property sheet makes no difference. This "rule-order independence" can be used to prevent ambiguity as to which rule applies in a given situation. One way to ensure rule-order independence is to only allow the following two types of rules:

Rules that have no tree selector and whose "leftmost" (using the syntax of Cascading Style Sheets) type is the same as that of the element adding the rule; and Rules that have a tree selector and where the last tree selector:

(i) is a child selector rather than a descendent selector and (ii) has a "leftmost" type that is the same as that of the element adding the rule.

In the above definitions, "tree selector" broadly means "any selector that looks at an element's relationship to other elements in the tree." The most familiar examples of tree selectors are child and descendant selectors, but this definition also contemplates other selectors such as first-child, adjacent, nth-child, parent, and ancestor selectors.

The following are examples of rules that an element of type "Foo" is allowed to add:

| | |
|---|---|
| Foo {} | Comment: Same type, no tree selector; |
| Foo [Property = "value"] {} | Comment: An attribute selector without a tree selector; |
| Foo > Bar {} | Comment: The tree selector is a child selector; and |
| Foo > Bar Baz {} | Comment: The last tree selector (the one farthest to the left) is a child selector even though the other is not; | while the following rules are not allowable:

| | |
|---|---|
| Foo Bar {} | Comment: The last tree selector is a descendent selector rather than a child selector; and |
| Bar > Foo {} | Comment: The type of the last (and, in this case, only) tree selector (Bar) is not the same as that of the element adding the rule. |

While these rules have proven to be particularly useful, other embodiments can implement other disambiguating rules.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be extended to cover the properties of visual and even non-visual interfaces without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

We claim:

1. In a computing environment comprising a user interface, the user interface comprising an element, the element comprising a property, a method for searching for a value to provide to the property, the method comprising:

searching for a default property sheet that is designated as important and that includes at least one rule that provides a value to the property;

finding a default property sheet that includes a plurality of rules and implementing a rule-order independence to prevent ambiguity as to which rule applies, wherein the rule-order independence is only implemented when more than one rule is present in the default property sheet;

searching for an in-line rule that provides a value to the property;

when no in-line rule is found that provides a value to the property, searching for a non-default property sheet that includes a rule that provides a value to the property;

when no non-default property sheet is found that Includes a rule that provides a value to the property, searching for a default property sheet that is not designated as important and that includes a rule that provides a value to the property;

when a rule that provides a value to the property is not found, applying a default value to the property to provide a value to the property, and providing a value to the property upon finding a rule that provides the value to the property therein defining the value provided for a user of the user interface;

wherein sources of rules that provide values to the property are prioritized from a highest priority to a lowest priority in that a rule from a rule source with the highest priority is applied to provide the value to the property while rules from lower priority rule sources are ignored.

2. The method of claim 1 wherein the element of the user interface is selected from the group consisting of: visual elements and audio elements.

3. The method of claim 1 wherein the default property sheet is designated as important by the user of the user interface.

4. The method of claim 1 wherein the default property sheet includes rules that express a presentation theme for the user interface.

5. The method of claim 4 wherein the presentation theme for the user interface is selected from the group consisting of: an accessibility theme, a system theme, and a branded application theme.

6. The method of claim 1 wherein searching for a non-default property sheet that includes a rule that provides a value to the property comprises:

searching for a non-default property sheet of the element that includes a rule that provides a value to the property; and when no non-default property sheet of the element is found that includes a rule that provides a value to the property, searching for a non-default property sheet of an ancestor of the element that includes a rule that provides a value to the property.

7. The method of claim 1 wherein the user interface comprises a plurality of elements, wherein at least one element comprises a plurality of properties, and wherein there is at most one default property sheet for all of the elements of the user interface.

8. The method of claim 1 further comprising:

when no default property sheet is found that is not designated as important and that includes a rule that provides a value to the property, then searching for a value inheritance rule that provides a value to the property.

9. The method of claim 1, wherein causing a theme sheet to be designated as important comprises receiving a selection from the user for an accessibility theme via a pull down menu.

10. A computer-readable medium containing computer-executable instructions for performing a method for searching for a value to provide to a property of an element of a user interface, the method comprising:

searching for a default property sheet that is designated as important and that includes at least one rule that provides a value to the property;

finding a default property sheet that includes a plurality of rules and implementing a rule-order independence to prevent ambiguity as to which rule applies in a given situation, wherein the rule-order independence is only implemented when more than one rule is present in the default property sheet;

causing a theme sheet to be designated as important and gain priority over the default property sheet wherein values for a size of a font or a type of the font provided by the theme sheet override values provided by the default property sheet;

searching for an in-line rule that provides a value to the property;

when no in-line rule is found that provides a value to the property, searching for a non-default property sheet that includes a rule that provides a value to the property;

when no non-default property sheet is found that includes a rule that provides a value to the property, searching for a default property sheet that is not designated as important and that includes a rule that provides a value to the property;

when a rule that provides a value to the property is not found, applying a default value to the property to provide a value to the property, and providing a value to the property upon finding a rule that provides the value to the property therein defining the value provided for a user of the user interface.

11. In a computing enviromnent comprising a user interface, the user interface comprising an element, the element comprising a property, a method for providing a value to the property, the method comprising:

finding a default property sheet designated as important and including rules that provides a value to the property;

implementing a rule-order independence to prevent ambiguity as to which rule applies, wherein the rule-order independence is only implemented when more than one rule is present in the default property sheet;

causing a theme sheet to be designate as important and gain priority over the default property sheet wherein values for a size of a font or a type of the font provided by the theme sheet override values provided by the default property sheet;

searching for an in line rule to provide a value to the property;

if the in-line rule exists to provide a value to the property, then applying the in-line rule to provide a value to the property;

else if a non-default property sheet includes a rule to provide a value to the property, then applying the non-default property sheet rule to provide a value to the property;

else if a default property sheet is not designated as important and includes a rule to provide a value to the property, then applying the rule of the non-important default property sheet to provide a value to the property; and else if a rule that provides a value to the property does not exist, then applying a default value to the property to provide a value to the property, and providing a value to the property upon finding a rule to provide a value to the property therein defining the value provided for a user of the user interface.

12. The method of claim 11 wherein the element of the user interface is selected from the group consisting of: visual elements and audio elements.

13. The method of claim 11 wherein the default property sheet is designated as important by the user of the user interface.

14. The method of claim 11 wherein the default property sheet includes at least two rules that express a presentation theme for the user interface.

15. The method of claim 14 wherein the presentation theme for the user interface is selected from the group consisting of: an accessibility theme, a system theme, and a branded application theme.

16. The method of claim 11 wherein applying any rule of the important default property sheet comprises providing a fixed value to the property.

17. The method of claim 11 wherein applying any rule of the important default property sheet comprises:
calculating a value, the calculated value based, at least in part, on the computing environment comprising the user interface; and
wherein providing the value to the property comprises providing the calculated value to the property.

18. The method of claim 11 wherein applying any rule of the important default property sheet does not depend upon the order of rules in the default property sheet.

19. The method of claim 11 wherein applying any rule of the important default property sheet comprises:
applying a more specific rule to provide a value to the property wherein the important default property sheet includes two rules to provide values to the property, and one of the rules is more specific than the other rule.

20. The method of claim 11 wherein applying the non-default property sheet rule to provide a value to the property comprises:
applying a rule of a non-default property sheet of the element to provide a value to the property when the non-default property sheet of the element includes the rule to provide a value to the property; and
applying a rule of a non-default property sheet of an ancestor of the element to provide a value to the property when the non-default property sheet of the ancestor of the element includes the rule to provide a value to the property.

21. The method of claim 11 wherein the user interface comprises a plurality of elements, wherein at least one element comprises a plurality of properties, and wherein there is at most one default property sheet for all of the elements of the user interface.

22. The method of claim 11 further comprising:
applying a value inheritance rule to provide a value to the property when there is no default property sheet that is not designated as important or when a default property sheet is not designated as important but does not include a rule to provide a value to the property, and the value inheritance rule exists to provide a value to the property.

23. A computer-readable medium containing computer-executable instructions for performing a method for providing a value to a property of an element of a user interface, the method comprising:
finding a default property sheet designated as important and including rules that provide a value to the property;
implementing a rule-order independence to prevent ambiguity as to which rule applies in a given situation;
causing a theme sheet to be designated as important and gain priority over the default property sheet wherein values for a size of a font or a type of the font provided by the theme sheet override values provided by the default property sheet;
searching for an in line rule to provide a value to the property;
if the in-line rule exists to provide a value to the property, then applying the in-line rule to provide a value to the property;
else if a non-default property sheet includes a rule to provide a value to the property, then applying the non-default property sheet rule to provide a value to the property;
else if a default property sheet is not designated as important but includes rules to provide a value to the property, then implementing the rule-order independence to prevent ambiguity as to which rule applies in a given situation when more than one rule is present in the property sheet to provide a value to the property and applying one of the rules of the non-important default property sheet to provide a value to the property;
else if a rule that provides a value to the property does not exist then applying a default value to the property to provide a value to the property; and
providing a value to the property when a rule to provide a value to the property exists therein defining the value provided for a user of the user interface.

24. In a computing environment comprising a user interface, the user interface comprising an element, the element comprising a property, a method for providing a value to the property, the method comprising:
applying a more specific rule of a default property sheet to provide a value to the property wherein a non-default property sheet is designated as important and includes a rule to provide a value to the property, and wherein the default property sheet includes at least two rules to provide a value to the property, and wherein the default property sheet at least two rules are more specific than the nondefault property sheet rule, therein implementing a rule-order independence to prevent ambiguity as to which rule applies in a given situation to provide a value to the property; and
providing the value to the property therein defining the value provided for a user of the user interface.

25. The method of claim 24 wherein the element of the user interface is selected from the group consisting of: visual elements and audio elements.

26. The method of claim 24 wherein a non-default property sheet is designated as important by the user of the user interface.

27. The method of claim 24 wherein a non-default property sheet includes rules that express a presentation theme for the user interface.

28. The method of claim 27 wherein the presentation theme for the user interface is selected from the group consisting of: an accessibility theme, a system theme, and a branded application theme.

29. The method of claim 24 wherein implementing a rule-order independence comprises providing a fixed value to the property.

30. The method of claim 24 wherein implementing a rule-order independence comprises:
calculating a value, the calculated value based, at least in part, on the computing environment comprising the user interface; and
providing the calculated value to the property.

31. The method of claim 24 wherein the user interface comprises a plurality of elements, wherein at least one element comprises a plurality of properties, and wherein there is at most one default property sheet for all of the elements of the user interface.

32. A computer-readable medium containing computer-executable instructions for performing a method for providing a value to a property of an element of a user interface, the method comprising:

applying a more specific rule from a default property sheet to provide a value to the property wherein a non-default property sheet is designated as important and includes a rule to provide a value to the property, and wherein the default property sheet includes at least two rules to provide a value to the property, and wherein the default property sheet rules are more specific than the non-default property sheet rule, therein implementing a rule-order independence to prevent ambiguity as to which rule applies in a given situation to provide a value to the property; and providing the value to the property therein defining the value provided for a user of the user interface.

* * * * *